US010875773B2

(12) United States Patent
Joo et al.

(10) Patent No.: US 10,875,773 B2
(45) Date of Patent: Dec. 29, 2020

(54) METHOD FOR STORAGE OR TRANSPORTATION OF GRAPHENE OXIDE

(71) Applicants: Cornell University, Ithaca, NY (US); JMC Corporation, Ulsan (KR)

(72) Inventors: Yong Lak Joo, Ithaca, NY (US); Chao-Wen Chang, Ithaca, NY (US); Somayeh Zamani, Ithaca, NY (US); Wonsik Jung, Seoul (KR); Taechung Kang, Goyangsi Kyunggido (KR); Sangjoon Park, Seoul (KR)

(73) Assignees: CORNELL UNIVERSITY, Ithaca, NY (US); JMC CORPORATION, Ulsan (KR)

(*) Notice: Subject to any disclaimer, the term of this patent is extended or adjusted under 35 U.S.C. 154(b) by 0 days.

(21) Appl. No.: 16/381,519

(22) Filed: Apr. 11, 2019

(65) Prior Publication Data
US 2020/0325024 A1 Oct. 15, 2020

(51) Int. Cl.
*C01B 32/198* (2017.01)
*B01F 11/02* (2006.01)
(Continued)

(52) U.S. Cl.
CPC ............ *C01B 32/198* (2017.08); *B01F 11/02* (2013.01); *C09D 1/00* (2013.01); *C09D 5/24* (2013.01); *H01B 1/04* (2013.01); *B01F 2215/0036* (2013.01); *C01B 2204/22* (2013.01); *C01P 2002/72* (2013.01); *C01P 2002/82* (2013.01);
(Continued)

(58) Field of Classification Search
CPC ... C01B 32/198; C01B 2204/22; B01F 11/02; B01F 2215/0036; C09D 5/24; C09D 1/00; C01P 2002/72; C01P 2004/50; C01P 2002/82; C01P 2006/40; H01B 1/04
See application file for complete search history.

(56) References Cited

U.S. PATENT DOCUMENTS

| 2013/0009337 A1* | 1/2013 | Koenders | ............... D01F 9/12 264/183 |
| 2014/0004344 A1* | 1/2014 | Kim | ............... D01D 1/06 428/367 |

(Continued)

FOREIGN PATENT DOCUMENTS

| KR | 1017827260000 | 9/2017 |
| WO | WO-2017188564 A1 * | 11/2017 |

OTHER PUBLICATIONS

Joo, Presentation, "Cost-Effective Handling and Transportation of Graphene Oxides: Folding and Redispersion of Graphine Oxide Materials", Cornell University, Apr. 11, 2019, 2 pages.
(Continued)

*Primary Examiner* — Mark Kopec
*Assistant Examiner* — Jaison P Thomas
(74) *Attorney, Agent, or Firm* — Duane Morris LLP; Gregory M. Lefkowitz; Jason M. Nolan

(57) ABSTRACT

The present disclosure relates to a method for storage or transportation of graphene oxide. The method for storage or transportation of graphene oxide comprises the steps of: carrying out wet spinning of a graphene oxide spinning solution to a coagulating bath to obtain graphene oxide pellets; drying the obtained graphene oxide pellets; storing or transporting the dried graphene oxide pellets; and redispersing the stored or transported graphene oxide pellets.

11 Claims, 3 Drawing Sheets

(51) Int. Cl.
    *C09D 5/24*         (2006.01)
    *C09D 1/00*         (2006.01)
    *H01B 1/04*         (2006.01)

(52) U.S. Cl.
    CPC ...... *C01P 2004/50* (2013.01); *C01P 2006/40* (2013.01)

(56) References Cited

U.S. PATENT DOCUMENTS

| | | | |
|---|---|---|---|
| 2016/0200580 A1* | 7/2016 | Liu | C01B 32/194 428/407 |
| 2018/0282917 A1* | 10/2018 | Gao | C01B 32/192 |
| 2019/0040550 A1* | 2/2019 | Han | D01F 11/122 |
| 2020/0071233 A1* | 3/2020 | Joo | C04B 35/62272 |

OTHER PUBLICATIONS

Cong, HP, et al., "Wet-spinning assembly of continuous, neat, and macroscopic graphene fibers," Sci Rep 2, 613 (2012). https://doi.org/10.1038/srep00613.

\* cited by examiner

METHOD FOR STORAGE OR TRANSPORTATION OF GRAPHENE OXIDE

TECHNICAL FIELD

The following disclosure relates to a method for storage or transportation of graphene oxide.

BACKGROUND

One of the main advantages of graphene oxide is that it requires lower cost for preparation as compared to graphene. In addition, graphene oxide may be converted into conductive graphene through vapor deposition on any substrate. For these reasons, graphene oxide is used for production of flexible electronic instruments, chemical sensors, or the like, to which conductive films may be applied. Further, graphene oxide is used as an electrode material for a battery, capacitor and a solar cell by virtue of its high surface area.

One of the important problems related with treatment and handling of graphene oxide is that graphene oxide should be provided in the form of a diluted solution (0.5-5 wt %), since use of graphene oxide requires a high degree of exfoliation and dispersion. Such a problem results in an increase in weight of materials to be transported to 100 times to 1000 times. For example, in order to transport 5 kg of graphene oxide, it is required to transport 500 L of liquid together. Such transportation of an extremely large volume is technically hard and causes a problem of an excessive increase in transportation cost for large-scale sales.

REFERENCES

Patent Documents

Korean Patent Publication No. 10-1782726

SUMMARY

The present disclosure is designed to solve the problems of the related art, and an embodiment of the present disclosure is directed to providing a method for storage or transportation of graphene oxide in a solid state without an additional solvent for dilution.

In one aspect, there is provided a method for storage or transportation of graphene oxide, including the steps of: carrying out wet spinning of a graphene oxide spinning solution to a coagulating bath to obtain graphene oxide pellets; drying the obtained graphene oxide pellets; storing or transporting the dried graphene oxide pellets; and redispersing the stored or transported graphene oxide pellets.

The method for storage or transportation of graphene oxide disclosed herein allows folding or assembly of graphene sheets by using a coagulating agent and elongation deformation with no problem of restacking. In addition, such folded or assembled graphene sheets may be redispersed and then used as graphene oxide. There is no need for a large amount of diluted solution, which, otherwise, is essentially required for storage or transportation of graphene oxide according to the related art. Thus, weight and volume to be stored or transported are reduced significantly, resulting in a decrease in cost required for storage or transportation. In addition, a wet spinning process allows mass production, and thus there is an advantage of satisfying a commercial need.

DETAILED DESCRIPTION OF EMBODIMENTS

Figure 1A:
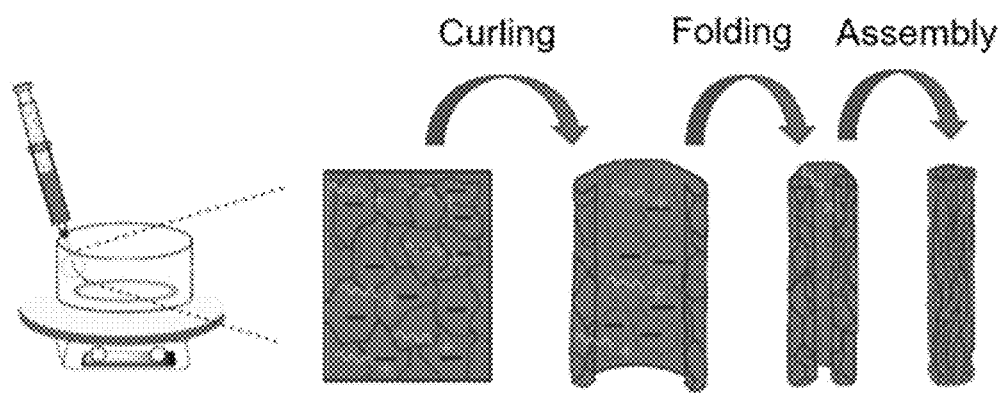
FIG. 1A is a schematic view illustrating the method for preparing graphene oxide pellets according to an embodiment of the present disclosure.

Hereinafter, various aspects and embodiments of the present disclosure will be explained in more detail.

In one aspect, there is provided a method for storage or transportation of graphene oxide, including the steps of: carrying out wet spinning of a graphene oxide spinning solution to a coagulating bath to obtain graphene oxide pellets; drying the obtained graphene oxide pellets; storing or transporting the dried graphene oxide pellets; and redispersing the stored or transported graphene oxide pellets. The method for storage or transportation of graphene oxide may be realized by the structure of graphene oxide sheets which may be folded in layers through wet spinning and then stored without restacking when being coagulated into a charged solution. By virtue of the above characteristics, graphene oxide can be handled in a solid state without any diluted solution. Therefore, it is possible to store or transport graphene oxide efficiently. In other words, the method allows preparation of graphene oxide pellets, storage or transportation thereof, and redispersion thereof in a solvent.

The graphene oxide spinning solution may include 0.1-25 wt %, preferably 0.5-10 wt %, and more preferably 1-5 wt % of graphene oxide in a solvent. When the graphene oxide spinning solution includes graphene oxide in an amount less than 0.1 wt %, it is difficult to prepare graphene oxide due to its insufficient weight. When the graphene oxide spinning solution includes graphene oxide in an amount larger than 25 wt %, there is a problem in that graphene oxide cannot be dispersed homogeneously in a solvent.

The solvent for the graphene oxide spinning solution may be any one selected from water, dimethyl formamide, methanol, ethanol, dimethyl pyrrolidinone and tetrahydrofuran, or a combination thereof.

The graphene oxide spinning solution may be injected to the coagulating bath at an injection rate of 0.1-50 mL/min, preferably 1-10 mL/min, and more preferably 3-7 mL/min. When the injection rate is less than 0.1 mL/min, it is difficult to obtain graphene oxide in a continuous fibrous phase.

When the injection rate is larger than 50 mL/min, graphene oxide may not be dispersed homogeneously.

The coagulating bath may include any one selected from water, ethanol, dimethyl pyrrolidinone and tetrahydrofuran, or a combination thereof. Preferably, the coagulating bath may include water and ethanol at a volume ratio of 0.1-10:1.

Most preferably, the coagulating bath may include water and ethanol at a volume ratio of 0.5-2:1. This is because the above-defined ratio facilitates homogeneous dispersion of graphene oxide.

The coagulating bath includes a coagulating agent, and the coagulating agent may include a quaternary ammonium salt represented by the following Chemical Formula 1 or a metal salt represented by the following Chemical Formula 2:

[Chemical Formula 1]

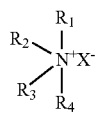

[Chemical Formula 2]

In Chemical Formula 1, $R_1$ represents a C1-C18 linear or branched saturated alkyl group; $R_2$ and $R_3$ are the same or different, and each represents a C1-C18 linear or branched saturated or unsaturated alkyl group or aromatic hydrocarbon; $R_4$ represents H, methyl or ethyl group; and X represents an anion capable of being bound to a quaternary ammonium cation.

In Chemical Formula 2, M represents an alkali metal or alkaline earth metal; Y represents an anion capable of being bound to an alkali metal or alkaline earth metal; m is an integer of 1-2; and n is an integer of 1-4.

The quaternary ammonium salt represented by the following Chemical Formula 1 or a metal salt represented by the following Chemical Formula 2 may be used individually or simultaneously as a coagulating agent.

The coagulating agent may be any one selected from cetyl trimethyl ammonium bromide (CTAB), cetyl trimethyl ammonium chloride (CTAC), dodecyl trimethyl ammonium bromide (DTAB), tetradecyl trimethyl ammonium bromide (TTAB), dioctadecyl dimethyl ammonium bromide (DODAB), dimethyl dioctadecyl ammonium chloride (DODMAC) and calcium chloride, or a combination thereof. Preferably, cetyl trimethyl ammonium bromide may be used as a coagulating agent. Cetyl trimethyl ammonium bromide neutralizes charges of negatively charged graphene oxide suspension by electrostatic force and hydrodynamic force to facilitate dispersion and to assist hydrophobic-hydrophobic interaction so that graphene oxide sheets may be folded easily without restacking.

The dried graphene oxide fibers may be pulverized and then stored or transported. Otherwise, the stored or transported graphene oxide fibers may be pulverized and redispersed in a solvent. Preferably, the pulverized graphene oxide pellets may have a reduced volume to facilitate handling and dispersion upon redispersion in a solvent.

The solvent for redispersion may be any one selected from water, ethanol, dimethyl pyrrolidinone and tetrahydrofuran, or a combination thereof, preferably water.

For the redispersion, any one surfactant selected from polyvinyl pyrrolidone (PVP), Triton X-100, Xanthan gum, sodium cholate, Pluronic F127 and sodium dodecylbenzene sulfonate, or a combination thereof may be used. Preferably, the surfactant may be sodium cholate. As can be seen from the following Examples, the redispersed graphene oxide solution can accomplish a high dispersion degree, when using sodium cholate.

The redispersion may be carried out by ultrasonication. Ultrasonication is preferred in that it can significantly improve the dispersibility of redispersion of graphene oxide.

Although it is not described clearly in the following Examples and Comparative Example, various conditions were varied to redisperse graphene oxide pellets in the method for storage or transportation of graphene oxide according to the present disclosure, and then dimension stability and dispersibility were determined through a polarized optical microscope.

As a result, it can be seen that dimensional stability and dispersibility were improved significantly after redispersion of graphene oxide and the original liquid crystal state were maintained, when the following conditions were satisfied totally, unlike the other conditions and number ranges:

(i) The graphene oxide spinning solution includes 1-5 wt % of graphene oxide in a solvent, (ii) the solvent for the graphene oxide spinning solution is water, (iii) the graphene oxide spinning solution is injected to the coagulating bath at an injection rate of 3-7 mL/min, (iv) the coagulating bath includes water and ethanol at a volume ratio of 0.5-2:1, (v) the coagulating bath includes cetyl trimethyl ammonium bromide as a coagulating agent, (vi) the solvent for redispersion is water, (vii) the surfactant used for redispersion is sodium cholate, and (viii) the redispersion is carried out by ultrasonication.

However, when any one of the above-mentioned conditions is not satisfied, dimensional stability and dispersibility were degraded after redispersion and the original liquid crystal state could not be maintained.

Preferred examples will now be described to help understanding of the present disclosure. The following examples are for illustrative purposes only and not intended to limit the scope of this disclosure. In addition, it will be apparent to those skilled in the art that various changes and modifications may be made based on the disclosure of the present invention including the following examples, and the changes and modifications are also within the scope of the present disclosure as defined in the following claims.

EXAMPLES

Preparation of Graphene Oxide Pellets Including Folded Graphene Oxide Using Wet Spinning Process First, 2 wt % of deaerated aqueous dispersion of graphene oxide (GO) was introduced to a plastic syringe and injected to a coagulation bath at an injection rate of 5 mL/min to obtain pellets. The coagulating bath included water and ethanol at a volume ratio of 1:1 in combination with cetyl trimethyl ammonium bromide (CTAB) at a concentration of 0.5 mg/mL. The coagulating bath was rotated at a speed of 15 rpm. The resultant pellets were allowed to stand for 30 minutes and wound by using a Teflon bar. Then, the Teflon bar was dipped in a washing bath including water and ethanol at a volume ratio of 1:1 for 40 minutes. Then, the pellets were dewound from the Teflon bar, removed from the washing bath and dried at room temperature. The graphene oxide pellets having a lateral dimension of 10-40 μm were designated as Kisco 40 and the graphene oxide pellets having a lateral dimension of 10 μm or less were designated as Kisco 10.

Figure 1B:
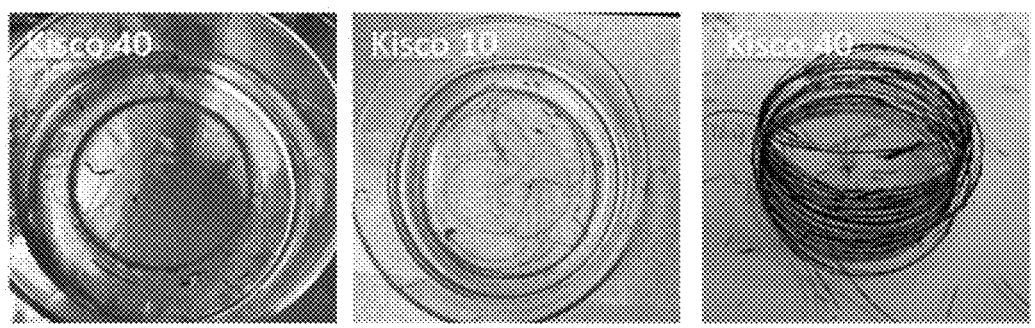
FIG. 1B shows hydrated Kisco 40 pellets, hydrated Kisco 10 pellets and dried Kisco 40 pellets according to an embodiment of the present disclosure.

FIG. 1A is a schematic view illustrating the method for preparing graphene oxide pellets according to an embodiment of the present disclosure. FIG. 1B shows hydrated Kisco 40 pellets, hydrated Kisco 10 pellets and dried Kisco 40 pellets from the left side.

The original dispersion and pellets of Kisco 40 and those of Kisco 10 obtained as described above were analyzed by X-ray diffractometry (XRD) and Fourier transform infrared spectrometry (FT-IR) to determine the macroscopic structure of GO. The dispersion was dried in an oven at 60° C. overnight and pulverized into powder before carrying out XRD and FT-IR.

Figure 2A:
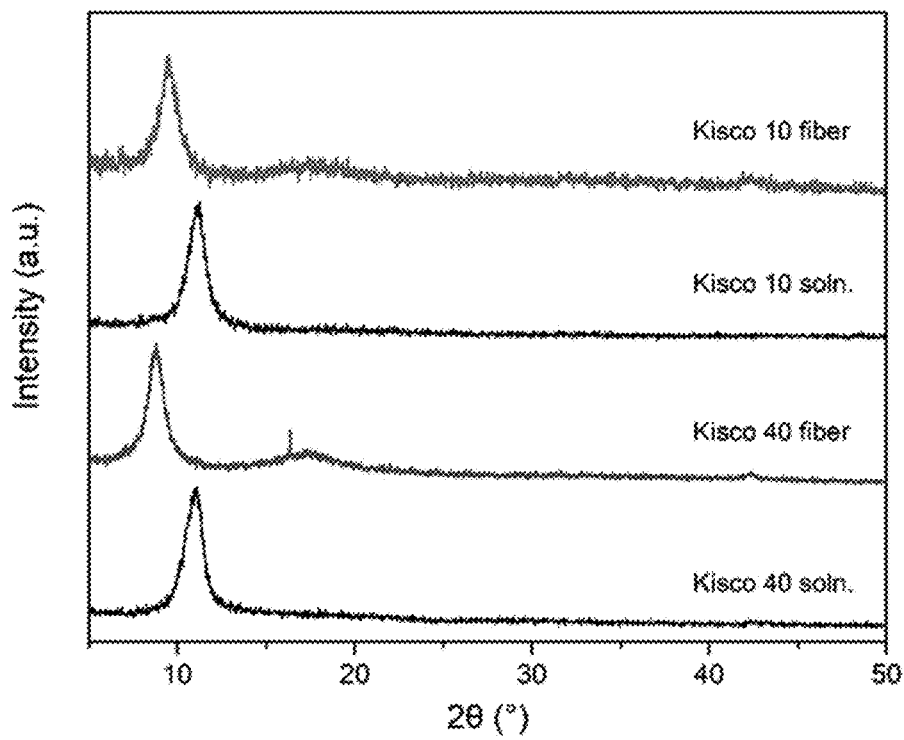
FIG. 2A shows the results of X-ray diffractometry (XRD) of powder-type or pellet-type graphene oxide according to an embodiment of the present disclosure.

FIG. 2A shows the results of XRD analysis of powder- or pellet-type GO according to an embodiment of the present disclosure. The GO powder of Kisco 40 and that of Kisco 10 prepared from gel showed a sharp diffraction peak at a $2\theta$ position of 11.9° and 11.25° corresponding to a d-spacing of 7.96 Å and 7.85 Å, respectively. After the wet spinning process, the peaks were shifted to 8.79° and 9.47° corresponding to a d-spacing of 10.04 Å and 9.32 Å, respectively. Such an increase in d-spacing results from intercalation of CTAB molecules. Then, the average sizes of crystalline regions of powder-type Kisco 40 and Kisco 10 and pellet-type Kisco 40 were calculated by using the Scherrer equation. Both the power and pellets had an average size of 15.28 nm. The same size of crystalline region suggests that the crystal structure undergoes no change before and after formation of fibers.

Figure 2B:
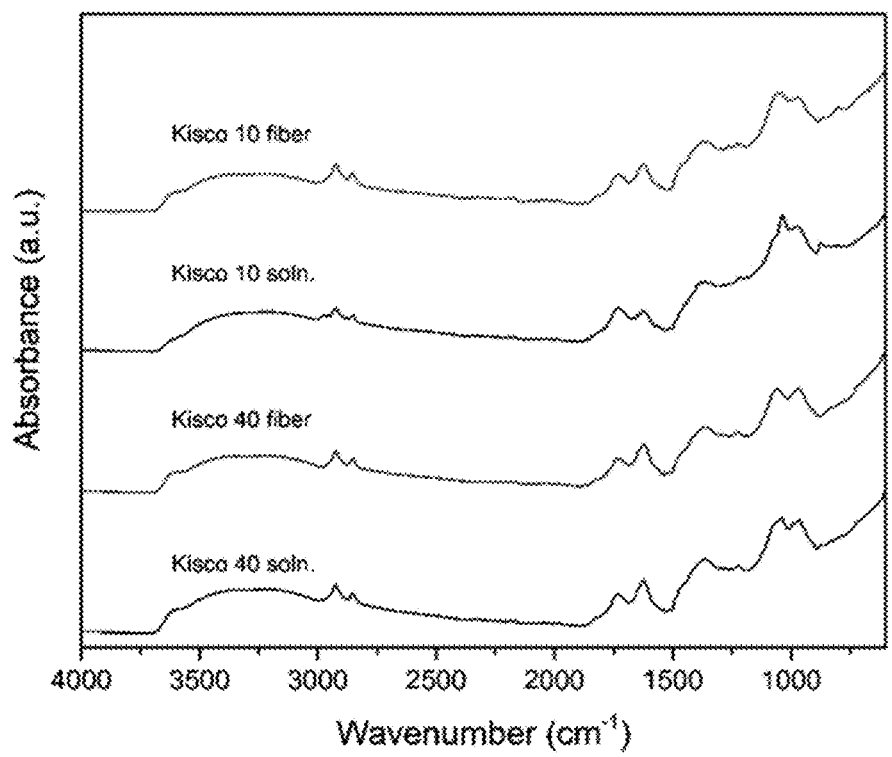
FIG. 2B is a Fourier transform infrared spectrometry (FTIR) diagram of powder-type or pellet-type graphene oxide according to an embodiment of the present disclosure.

The powder and pellets shows a similar FT-IR absorption pattern. FIG. 2B shows FT-IR diagrams of the powder and pellets according to an embodiment of the present disclosure. This demonstrates that GO pellets retain the functional groups (hydroxyl and carboxyl groups) of the original GO dispersion.

Redispersion of Folded Graphene Oxide

The folded graphene oxide prepared as described above was pulverized by using a mortar. The resultant powder was dispersed in water by using a vortex mixer for 30 seconds and in an ultrasonication bath for 3 hours to obtain dispersion.

Figure 3A:
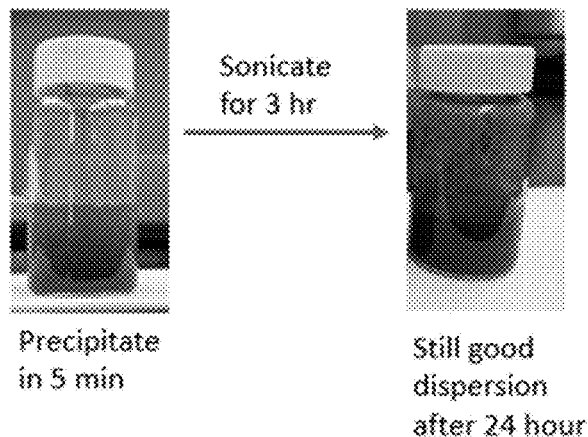
FIG. 3A shows an image illustrating redispersion of graphene oxide subjected to ultrasonication according to an embodiment of the present disclosure.

FIG. 3A shows an image illustrating redispersion of graphene oxide subjected to ultrasonication according to an embodiment of the present disclosure.

To determine some surfactants for the effect of improving dispersibility, the dispersion was divided and polyvinyl pyrrolidone (PVP), Triton X-100, Xanthan gum, sodium cholate or Pluronic F127 were introduced to each divided dispersion. Each dispersion was ultrasonicated for 1 hour and was allowed to stand for 1 day.

Figure 3B:
FIG. 3B shows an image illustrating solutions containing various types of surfactants, wherein graphene oxide according to an embodiment of the present disclosure is redispersed.

FIG. 3B shows an image illustrating solutions containing various types of surfactants, wherein graphene oxide according to an embodiment of the present disclosure is redispersed. It can be seen from the color of each dispersion that sodium cholate shows the highest effect of improving dispersibility among the six surfactants.

Figure 3C:
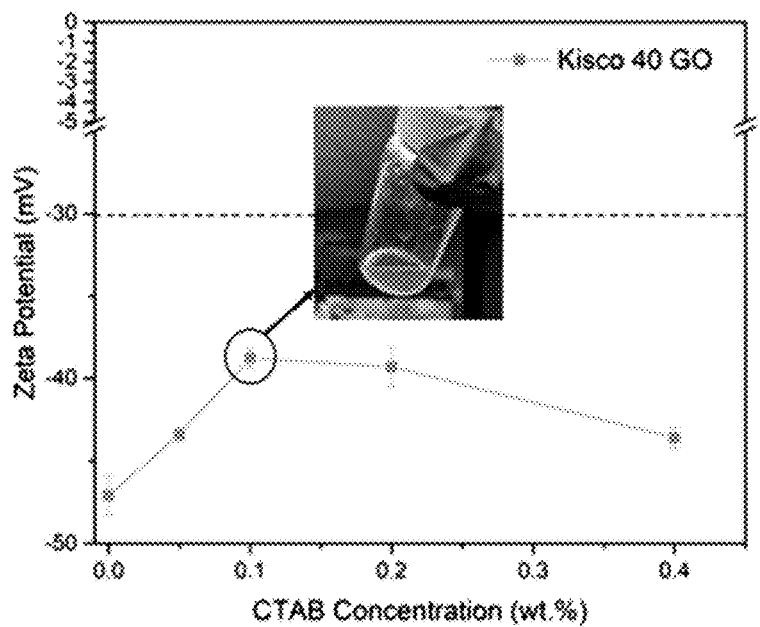
FIG. 3C is a graph illustrating the relationship between cetyl trimethyl ammonium bromide (CTAB) concentration of redispersed graphene oxide solution according to an embodiment of the present disclosure and zeta potential, wherein the inserted image illustrates the dispersion having the smallest negative value.

Evaluation of Stability of Dispersion FIG. 3C is a graph illustrating the relationship between CTAB concentration of redispersed graphene oxide solution according to an embodiment of the present disclosure and zeta potential, wherein the inserted image illustrates the dispersion having the smallest negative value. In FIG. 3C, 0.0 wt % represents the original GO gel solution and the others represent redispersion of GO pellets having a different concentreation of coagulating agent.

In general, when a colloid has a negative zeta potential, the absolute value of which is larger than −30 mV, it is regarded as stable dispersion formed by sufficient interaction of electrostatic repulsion. As can be seen from FIG. 3C, the original (no surfactant is introduced) Kisco 40 GO gel solution has a zeta potential of −47.1 mV. After redispersing GO pellets in a CTAB coagulating bath having a different concentration, the absolute value of zeta potential was decreased slightly. This is because positively charged CTAB molecules were attached to the negatively charged GO flakes to cause a decrease in potential. Even though the zeta potential becomes more positive, it is still −30 mV or less. This suggests that the dispersion has sufficient stability. It can be also seen from the inserted image of FIG. 3C that the dispersion still shows excellent dispersibility even at the zeta potential having the smallest absolute value.

Therefore, the method for storage or transportation of graphene oxide disclosed herein allows folding or assembly of graphene sheets by using a coagulating agent and elongation deformation with no problem of restacking. In addition, such folded or assembled graphene sheets may be redispersed to be used as graphene oxide. There is no need for a large amount of diluted solution, which, otherwise, is essentially required for storage or transportation of graphene oxide according to the related art. Thus, weight and volume to be stored or transported are reduced significantly, resulting in a decrease in cost required for storage or transportation.

While the present disclosure has been described with respect to the specific embodiments, it will be apparent to those skilled in the art that various changes and modifications may be made without departing from the spirit and scope of the disclosure as defined in the following claims.

What is claimed is:

1. A method for storing or transporting graphene oxide, comprising the steps of:
    injecting a graphene oxide spinning solution to a coagulating bath to obtain graphene oxide pellets;
    drying the obtained graphene oxide pellets;
    storing or transporting the dried graphene oxide pellets; and
    redispersing the stored or transported graphene oxide pellets,
    wherein the coagulating bath comprises water and ethanol at a volume ratio of 0.1-10:1.

2. The method according to claim 1, wherein the graphene oxide spinning solution comprises 0.1-25 wt % of graphene oxide in a solvent.

3. The method according to claim 2, wherein the solvent for the graphene oxide spinning solution is selected from the group consisting of water, dimethyl formamide, methanol, ethanol, dimethyl pyrrolidinone, tetrahydrofuran, and a combination thereof.

4. The method according to claim 1, wherein the graphene oxide spinning solution is injected to the coagulating bath at an injection rate of 0.1-50 mL/min.

5. The method according to claim 1, wherein the coagulating bath further comprises dimethyl pyrrolidinone, tetrahydrofuran, or a combination thereof.

6. The method according to claim 1, wherein the coagulating bath comprises a coagulating agent, and the coagulating agent comprises a quaternary ammonium salt represented by the following Chemical Formula 1 or a metal salt represented by the following Chemical Formula 2:

[Chemical Formula 1]

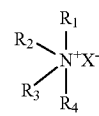

[Chemical Formula 2]

$M_mY_n$ wherein $R_1$ is a C1-C18 linear or branched saturated alkyl group; $R_2$ and $R_3$ are the same or different, and each represents a C1-C18 linear or branched saturated or unsaturated alkyl group or aromatic hydrocarbon; $R_4$ represents H, methyl or ethyl group; and X represents an anion capable of being bound to a quaternary ammonium cation; and M is an alkali metal or alkaline earth metal; Y represents an anion capable of being bound to an alkali metal or alkaline earth metal; m is an integer of 1-2; and n is an integer of 1-4.

7. The method according to claim 6, wherein the coagulating agent is selected from the group consisting of cetyl trimethyl ammonium bromide (CTAB), cetyl trimethyl ammonium chloride (CTAC), dodecyl trimethyl ammonium bromide (DTAB), tetradecyl trimethyl ammonium bromide (TTAB), dioctadecyl dimethyl ammonium bromide (DODAB), dimethyl dioctadecyl ammonium chloride (DODMAC), calcium chloride, and a combination thereof.

8. The method according to claim 1, wherein the step of redispersing comprises a solvent selected from the group consisting of water, ethanol, dimethyl pyrrolidinone, tetrahydrofuran, and a combination thereof.

9. The method according to claim 1, wherein the step of redispersing comprises a surfactant selected from the group consisting of polyvinyl pyrrolidone (PVP), Triton X-100, Xanthan gum, sodium cholate, Pluronic F127, sodium dodecylbenzene sulfonate, and a combination thereof.

10. The method according to claim 1, wherein the redispersion is carried out by ultrasonication.

11. A method for storing or transporting graphene oxide, comprising the steps of:
   injecting a graphene oxide spinning solution to a coagulating bath to obtain graphene oxide pellets;
   drying the obtained graphene oxide pellets;
   storing or transporting the dried graphene oxide pellets; and
   redispersing the stored or transported graphene oxide pellets,
wherein:
the graphene oxide spinning solution comprises 1-5 wt % of graphene oxide in a solvent;
the solvent for the graphene oxide spinning solution is water;
the graphene oxide spinning solution is injected to the coagulating bath at an injection rate of 3-7 mL/min;
the coagulating bath comprises water and ethanol at a volume ratio of 0.5-2:1;
the coagulating bath includes cetyl trimethyl ammonium bromide as a coagulating agent;
the solvent for redispersion is water;
a surfactant used for redispersion is sodium cholate; and
the redispersion is carried out by ultrasonication.

* * * * *